US 7,344,592 B2

(12) United States Patent
Setliff et al.

(10) Patent No.: US 7,344,592 B2
(45) Date of Patent: Mar. 18, 2008

(54) CONTROLLED LOW STRENGTH FLOWABLE FILL COMPOSITION WITH IRON CHELATING COMPOUNDS

(75) Inventors: Jerry Setliff, Corpus Christi, TX (US); Scott F. Timmons, San Antonio, TX (US); Clinton W. Pike, Cypress, TX (US)

(73) Assignee: Flowable Fill, Ltd., Corpus Christi, TX (US)

( * ) Notice: Subject to any disclaimer, the term of this patent is extended or adjusted under 35 U.S.C. 154(b) by 0 days.

(21) Appl. No.: 10/552,345

(22) PCT Filed: Mar. 10, 2004

(86) PCT No.: PCT/US2004/007247

§ 371 (c)(1),
(2), (4) Date: Jun. 30, 2006

(87) PCT Pub. No.: WO2004/080911

PCT Pub. Date: Sep. 23, 2004

(65) Prior Publication Data

US 2007/0006777 A1    Jan. 11, 2007

Related U.S. Application Data

(60) Provisional application No. 60/453,231, filed on Mar. 10, 2003.

(51) Int. Cl.
*C04B 18/06*    (2006.01)

(52) U.S. Cl. .................... 106/705; 106/819; 106/823; 106/DIG. 1
(58) Field of Classification Search ............... 106/705, 106/819, 823, DIG. 1
See application file for complete search history.

(56) References Cited

U.S. PATENT DOCUMENTS

| 6,008,275 | A  | * | 12/1999 | Moreau et al. | ............. | 524/5 |
| 6,290,770 | B1 | * | 9/2001  | Moreau et al. | ............. | 106/708 |
| 6,391,106 | B2 | * | 5/2002  | Moreau et al. | ............. | 106/724 |
| 6,869,474 | B2 | * | 3/2005  | Perez-Pena et al. | ....... | 106/727 |

* cited by examiner

*Primary Examiner*—Paul Marcantoni
(74) *Attorney, Agent, or Firm*—Jackson Walker, LLP

(57) ABSTRACT

A rapid setting, controlled low strength composition of Class C fly ash is provided having a quantity of hydrated lime and an iron chelating compound in an amount sufficient to accelerate the hydration and set time of the fly ash. In some examples, a filler material is added. A method for acceleration of the hydration and set time of a cementitious mixture is provided wherein hydrated lime is added to the cementitious mixture in an amount in the range of 0.1% to 15% by weight and an iron chelating compound in an amount in the range of 0.01% to 5.0% by weight of the cementitious material. Further, a calcium source and an iron chelating compound may be added to a Class C fly ash to accelerate the hydration and set time of the ash.

3 Claims, 1 Drawing Sheet

CONTROLLED LOW STRENGTH FLOWABLE FILL COMPOSITION WITH IRON CHELATING COMPOUNDS

This application claims priority to now abandoned U.S. Provisional Application Ser. No. 60/453,231 filed Mar. 10, 2003.

BACKGROUND OF THE INVENTION

This invention relates to Controlled Low-Strength Mixtures (CLSMs), or flowable back-fills. This class of materials has utility as pipe bedding materials where they are used to both protect the pipe from external agents and internal loads. They have also been used as an erosion barrier in embankments and as a mine fill material. CLSMs typically have strengths of less than 2000 psi and, in cases where removal is contemplated, less than 200 psi for ease of removal. The material should be initially in the form of an easily punipable, self-leveling slurry. Rapid early strength development (approximately 50-70 psi) is a desirable property and is currently not obtainable with commercial products without the penalty of high strength development at later stages. U.S. Pat. No. 5,106,422 discloses Class C Fly ash in a rapid setting flowable backfill composition and method for its use.

However, such existing compositions are based upon the use of either Portland cement or Class C fly ash used individually or in combination as the hydraulic cement component of the CLSM system. Typically these cementitious materials are used at less than 5% by weight in the case of Portland cement or as much as 50% in the case of Class C fly ash with the remainder being some form of aggregate, usually fine sand or soil from the spoil with small amounts of additional rock and gravel or Class F fly ash. Cement-based materials can take days to hydrate, cure, and achieve even a modest strength of 50 psi which is typically the minimum strength required for a man to walk upon the surface of the bedding material and represents the minimum safe time before the cover fill may be placed. Class C fly ash based systems may take as long as four hours to hydrate, cure, and achieve this strength. In many cases; locally available-Class C fly ash is not desirable for use in these types of product due to slow hydration, cure, and set times and low strengths. Strength may be compensated for by the use of additional Class C fly ash but the cost of the additional fly ash may result in cost prohibitive products.

Thus, the system of the present invention minimizes the down time before cover fill may be placed and represents a significant savings of both time and money for the user. Furthermore, the present inventive composition and method allow for control variability in strength and hydration, cure, and set times of a CLSM system utilizing Class C fly which results in a Class C-based flowable fill capable of competing in markets previously inaccessible.

DETAILED DESCRIPTION OF THE PREFERRED EMBODIMENT

Figure 1:
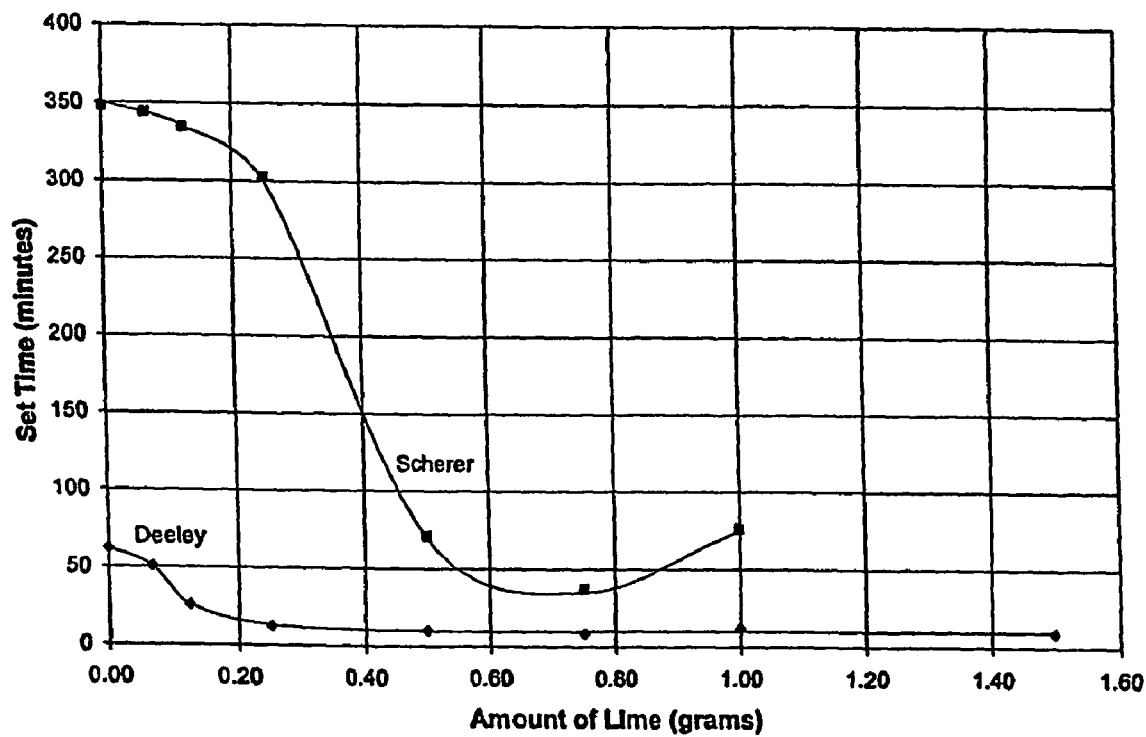
FIG. 1 is a graphic representation of the effect of set time of Class C mortars with lime.

Class C fly ash as defined in ASTM C 618 is a coal combustion product that meets particular size requirements and mineralogical specifications. A typical chemical composition for this class of fly ash is as follows:

|  | Percent by Weight |
| --- | --- |
| Silicon dioxide ($SiO_2$) plus aluminum oxide ($Al_2O_3$) plus iron oxide ($Fe_2O_3$), min. | 50.0 |
| Sulfur trioxide ($SO_3$), max. | 5.0 |
| Moisture content, max. | 3.0 |
| Loss on ignition, max. | 6.0 |

This is a rather broad description for this class of material, and significant variability may exist for materials conforming to this requirement. The variability manifests itself as differences in hydration and set time and strength between several samples of Class C fly ash either from the same or different sources. It has been found that a major factor contributing to variability is the amount of available calcium present in the sample. Additionally, soluble iron content contributes to slow setting times. Furthermore, the addition of small amounts of calcium to Class C fly ash has no deleterious effects upon flowable fill and can accelerate the rate of hydration and cure while minimizing the differences in set time and strength of flowable fill mixtures containing Class C fly ash.

Where soluble iron is present in sufficient quantity and extra calcium alone is inadequate to accelerate the rate of hydration, iron chelating compounds may be added, even in very small amounts, to offset the soluble iron effect. The iron chelating compound may include:

sodium chloride, sodium thiosulfate, triethanolamine, diethanolamine, polyethyleneimine, amino-substituted acrylic monomers or polymers, morpholine and substituted morpholine compounds, urea, guanidine salts, pyrole and pyrole compounds, polyvinylpyrole, imidizole compounds, pyrazoles, pyridine and pyridine compounds (especially ortho alkoxy-substituted pyridines), amino phenol (especially ortho amino phenol), amino cresol, ortho anisidine, amine acetate surfactants (such as Armac HT and Armac 18D-40 from Akzo Nobel Chemicals), amine oxide surfactants (such as Ammonyx series of surfactants from Stepan Company, Schercamox series of surfactants from Scher Chemicals, Foamox series of surfactants from Alzo, Inc., Chemoxide series of surfactants from Chemron Corp.,), amine surfactants (such as the Armeen and Redicote series of surfactants from Akzo Nobel Chemicals, the Incromine series of surfactants from Croda, Inc., the Tealan series of surfactants from R.I.T.A. Corp.), and mercapto surfactants (such as Burco TME from Burlington Chemicals).

The iron chelating compound maybe in quantities in the range of 0.01% to 5.0% by weight. Effective results have been obtained and reasonably should be obtained from chelating agents or compounds selected from the group consisting of an alkanolamine, a polymer of ethyleneimine, a block copolymer containing polyethyleneimine segments, an amino-substituted polymer of acrylic acid, the salt of an amino-substituted polymer of acrylic acid, a carboxyated amine compound, a salt of a carboxyated amine compound, ethylenediaminetetraacetic acid and salts thereof, nitrilotriacetic acid and salts thereof, an amine substituted surfactant, an amine oxide substituted surfactant, and a guanidine salt.

The following examples illustrate the nature of the present invention. Set times were determined when a 0.25" diameter penetrometer needle provided a reading of 200 psi on insertion to a depth of 1.0". No iron chelating compounds were used in Examples 1-13.

EXAMPLE 1

Coal Fly ash from Deeley Power Plant, San Antonio, Tex., as obtained and used as received. 50 grams of Class C Fly ash, 250 grams ASTM C 33 graded washed silica sand (Espey Sand, San Antonio, Tex.) and 35 mL deionized water were mixed for 1 minute and poured into a 2" cube mold. The set time was determined to be 62 minutes as shown in Table 1 below.

EXAMPLES 2-8

Coal Fly ash from Deeley Power Plant, San Antonio, Tex., was obtained and used as received. 50 grams of Class C Fly ash, 250 grams ASTM C 33 graded washed silica sand (Espey Sand, San Antonio, Tex.), varying amounts of type S hydrated lime and 35 mL deionized water were mixed for 1 minute and poured into a 2" cube mold. The set time for these examples are shown in Table 1 for the varying amounts of lime.

EXAMPLES 9-13

Coal Fly ash from Scherer Power Plant, Atlanta, Ga., was obtained and used as received. 50 grams of Class C Fly ash, 250 grams ASTM C 33 graded washed silica sand (Espey Sand, San Antonio, Tex.), varying amounts of type S hydrated lime and 35 mL deionized water were mixed for 1 minute and poured into a 2" cube mold. The set times for these examples are shown in Table 1 for the varying amounts of lime.

A graphic representation of the effect of set time of these Class C motars with lime of varying amounts is shown in FIG. 1.

The following examples illustrate the effect of the addition of an iron chelating compound, namely, an alkanolamine.

TABLE 1

Set times of Class C Fly ash motar cubes containing varying amounts of type S lime.

| Lime (grams) | Example Number | Set Time (minutes) Deeley | Example Number | Set Time (minutes) Scherer |
|---|---|---|---|---|
| 0.00 | 1 | 62 | 9 | 348 |
| 0.07 | 2 | 51 | — | — |
| 0.13 | 3 | 26 | — | — |
| 0.25 | 4 | 12 | 10 | 303 |
| 0.50 | 5 | 10 | 11 | 71 |
| 0.75 | 6 | 8 | 12 | 37 |
| 1.00 | 7 | 12 | 13 | 76 |
| 1.50 | 8 | 9 | | |

The following examples illustrate the effect of the addition of an iron chelating compound, namely, an alkanolamine.

EXAMPLE 14

| Ingredient | Amount (g) |
|---|---|
| Concrete Sand | 0 |
| Type C Fly Ash | 100 |
| Hydrated Lime | .003 |
| Triethanolamine | .04 |
| Water | 25 |

The dry ingredients were mixed together and the water was added with mixing until a smooth, pourable consistency was obtained. The set time was 17 minutes.

EXAMPLE 15

| Ingredient | Amount (g) |
|---|---|
| Concrete Sand | 200 |
| Type C Fly Ash | 100 |
| Hydrated Lime | .3 |
| Triethanolamine | .48 |
| Water | 39 |

The dry ingredients were mixed together and the water was added with mixing until a pourable consistency was obtained. The set time was 17 minutes.

EXAMPLE 16

| Ingredient | Amount (g) |
|---|---|
| Concrete Sand | 250 |
| Type C Fly Ash | 50 |
| Hydrated Lime | 7.5 |
| Triethanolamine | .1 |
| Water | 40 |

The dry ingredients were mixed together briefly and the water and triethanolamine added with continued mixing. The set time was 23 minutes.

The invention claimed is:

1. A rapid setting, controlled low-strength backfill composition consisting essential of:
   a. Class C flyash in the amount of approximately 79.90% by weight;
   b. Hydrated lime in the amount of approximately 0.02% by weight;
   c. Triethanolamine in the amount of approximately 0.30% by weight; and
   d. Water in the amount of approximately 19.80% by weight.

2. A rapid setting, controlled low-strength backfill composition consisting essential of:
   a. Class C flyash in the amount of approximately 29.40% by weight;
   b. Hydrated lime in the amount of approximately 0.10% by weight;

c. Triethanolamine in the amount of approximately 0.10% by weight;
d. Water in the amount of approximately 11.60% by weight; and
e. Sand in the amount of approximately 58.80% by weight.

3. A rapid setting, controlled low-strength backfill composition consisting essential of:
  a. Class C flyash in the amount of approximately 14.40% by weight;
  b. Hydrated lime in the amount of approximately 2.0% by weight;
  c. Triethanolamine in the amount of approximately 0.03% by weight;
  d. Water in the amount of approximately 11.60% by weight; and
  e. Sand in the amount of approximately 72.0% by weight.

* * * * *